US011178636B2

(12) United States Patent
Kuang et al.

(10) Patent No.: US 11,178,636 B2
(45) Date of Patent: Nov. 16, 2021

(54) SYSTEM INFORMATION TRANSMISSION METHOD AND APPARATUS

(71) Applicant: HUAWEI TECHNOLOGIES CO., LTD., Shenzhen (CN)

(72) Inventors: Yiru Kuang, Beijing (CN); Haibo Xu, Beijing (CN); Nathan Edward Tenny, San Diego, CA (US); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 16/496,494

(22) PCT Filed: Mar. 24, 2017

(86) PCT No.: PCT/CN2017/078157
§ 371 (c)(1),
(2) Date: Sep. 23, 2019

(87) PCT Pub. No.: WO2018/170913
PCT Pub. Date: Sep. 27, 2018

(65) Prior Publication Data
US 2020/0029299 A1    Jan. 23, 2020

(51) Int. Cl.
*H04W 68/00* (2009.01)
*H04W 76/27* (2018.01)
*H04W 4/06* (2009.01)
(Continued)

(52) U.S. Cl.
CPC ........... *H04W 68/005* (2013.01); *H04W 4/06* (2013.01); *H04W 8/005* (2013.01); *H04W 76/27* (2018.02); *H04W 92/18* (2013.01)

(58) Field of Classification Search
CPC ..... H04W 68/005; H04W 76/27; H04W 4/06; H04W 8/005; H04W 92/18; H04W 48/08
See application file for complete search history.

(56) References Cited

U.S. PATENT DOCUMENTS

2010/0003978 A1    1/2010  Catovic et al.
2011/0199950 A1*   8/2011  Klingenbrunn ....... H04W 36/14
                                                            370/311
(Continued)

FOREIGN PATENT DOCUMENTS

CN    101998272 A    3/2011
CN    101998580 A    3/2011
(Continued)

OTHER PUBLICATIONS

Huawei et al., "Paging and access", 3GPP TSG RAN WG2 Meeting #97, R2-1701136, Feb. 13-17, 2017, total 5 pages, Athens, Greece.
(Continued)

*Primary Examiner* — Walter J Divito
(74) *Attorney, Agent, or Firm* — Maier & Maier, PLLC

(57) ABSTRACT

When cell system information changes, a first terminal device receives, during on duration of the first terminal device, system information sent by a second terminal device, so that the first terminal device can receive the system information through a sidelink between the first terminal device and the second terminal device without a need to maintain a cellular link, thereby reducing complexity and power consumption of system information transmission. Alternatively, when cell system information changes and a first terminal device has only one receive radio frequency chain, the first terminal device obtains system information within a gap period of communication between the second terminal device and the first terminal device through a link between the first terminal device and a network device, so that the first terminal device maintains a cellular link only within the gap period, thereby reducing complexity and power consumption of system information transmission to some extent.

8 Claims, 9 Drawing Sheets

(51) Int. Cl.
*H04W 8/00* (2009.01)
*H04W 92/18* (2009.01)

(56) References Cited

U.S. PATENT DOCUMENTS

| | | |
|---|---|---|
| 2011/0319081 A1 | 12/2011 | Deivasigamani et al. |
| 2013/0039309 A1 | 2/2013 | Chiu |
| 2015/0208332 A1* | 7/2015 | Baghel ................ H04W 76/14 370/255 |
| 2015/0365897 A1 | 12/2015 | Hu et al. |
| 2016/0007271 A1 | 1/2016 | Plicanic Samuelsson et al. |
| 2016/0381666 A1 | 12/2016 | Kim et al. |

FOREIGN PATENT DOCUMENTS

| | | |
|---|---|---|
| CN | 102077662 A | 5/2011 |
| CN | 102300289 A | 12/2011 |
| CN | 102754484 A | 10/2012 |
| CN | 103179637 A | 6/2013 |
| CN | 103338500 A | 10/2013 |
| CN | 103888931 A | 6/2014 |
| CN | 105246027 A | 1/2016 |
| CN | 106063352 A | 10/2016 |
| CN | 106471861 A | 3/2017 |
| WO | 2011/099744 A2 | 8/2011 |
| WO | 2011/100707 A1 | 8/2011 |

OTHER PUBLICATIONS

Nokia et al., "Pairing, RRC states and Control Plane relaying", 3GPP TSG-RAN WG2 Meeting #95bis, R2-166746, Oct. 10-14, 2016, total 4 pages, Kaohsiung, Taiwan.

* cited by examiner

SYSTEM INFORMATION TRANSMISSION METHOD AND APPARATUS

This application is a national stage of International Application No. PCT/CN2017/078157, filed on Mar. 24, 2017, which is hereby incorporated by reference in its entirety.

FIELD

Embodiments relate to the field of communications technologies, and in particular, to a system information transmission method and apparatus.

BACKGROUND

A device-to-device (D2D) communication mode is a communication mode in which a transmitting end directly sends data to a receiving end without forwarding by a base station or a cellular network. A relatively special mode in the D2D communication mode is a user equipment-to-network relay (UE-to-network relay) scenario. In the UE-to-network relay scenario, a terminal device (for example, user equipment (UE)) is connected to a network by using another terminal device having a relay function. Usually, the former is referred to as a remote terminal device (Remote UE), and the latter is referred to as a relay terminal device (Relay UE).

In the UE-to-network relay scenario, if system information of a camped-on cell or a serving cell of the remote terminal device changes, a base station of the camped-on cell or the serving cell of the remote terminal device sends a paging message to the remote terminal device, and indicates, by using the paging message, that the system information changes. After receiving the paging message sent by the base station, the remote terminal device determines that the system information changes and obtains changed system information. The remote terminal device needs to be located in coverage of a cell to obtain the changed system information, and receives the changed system information through a cellular link between the remote terminal device and the base station.

The remote terminal device receives the system information in the foregoing manner, resulting in relatively high complexity and relatively high power consumption.

SUMMARY

Embodiments provide a system information transmission method and apparatus, to reduce complexity and power consumption of receiving system information by a remote terminal device.

According to a first aspect, a system information transmission method is provided. In the method, a second terminal device sends system information to a first terminal device during on duration of the first terminal device, and the first terminal device receives, during the on duration of the first terminal device, the system information sent by the second terminal device, so that the first terminal device can receive the system information through a sidelink between the first terminal device and the second terminal device without a need to maintain a cellular link, thereby reducing complexity and power consumption of system information transmission.

In a possible implementation, the on duration of the first terminal device may be a paging occasion of the first terminal device. The second terminal device sends the system information to the first terminal device on the paging occasion of the first terminal device, and the first terminal device receives, on the paging occasion of the first terminal device, the system information sent by the second terminal device, so that the first terminal can receive, regardless of whether the first terminal is in a radio resource control (RRC) idle mode or an RRC connected mode, the system information sent by the second terminal device.

In a possible implementation, the second terminal device may use a resource in a sending resource pool that is configured or preconfigured by a base station by using a broadcast message as a resource that is used by the second terminal device to send the system information to the first terminal device. The resource in the sending resource pool may be a resource that is used by the second terminal device to send a paging message. The second terminal device may directly send the system information by using a resource that is used by a paging message originally sent by the second terminal device, and use the resource used by the original paging message as the resource in the sending resource pool. The second terminal device may alternatively add the system information to the original paging message to obtain a new paging message, and use a resource used by the new paging message as the resource in the sending resource pool. The resource in the sending resource pool may be alternatively a resource that is used by the second terminal device to send the system information to the first terminal device.

The second terminal device sends the system information to the first terminal device at least one time on the paging occasion of the first terminal device by using the resource in the sending resource pool, and the first terminal device receives, on the paging occasion of the first terminal device, the system information sent by the second terminal device at least one time by using the resource in the sending resource pool. The sending resource pool is configured or preconfigured by a network device by using a broadcast message.

In another possible implementation, the second terminal device may configure a dedicated resource, and use the dedicated resource as a resource that is used by the second terminal device to send the system information to the first terminal device. The dedicated resource is determined by a network device based on a dedicated resource requested by the second terminal device from the network device and a time domain resource location that is of the paging occasion and that is indicated by the second terminal device to the network device.

The second terminal device sends the system information to the first terminal device at least one time on the paging occasion of the first terminal device by using the dedicated resource, and the first terminal device receives, on the paging occasion of the first terminal device, the system information sent by the second terminal device at least one time by using the dedicated resource. The dedicated resource is configured by the network device for the second terminal device.

In still another possible implementation, that the second terminal device sends the system information at least one time on the paging occasion of the first terminal device by using the resource in the sending resource pool or by using the dedicated resource means that the second terminal device sends the system information on one or more paging occasions of the first terminal device. An implementation may include: sending, by the second terminal device, the system information on the one or more paging occasions of the first terminal device in a broadcast manner, or sending, by the second terminal device, the system information on the one or more paging occasions of the first terminal device in a multicast manner, or sending, by the second terminal device, the system information on the one or more paging occasions of the first terminal device in a unicast manner.

In still another possible implementation, the system information sent by the second terminal device to the first terminal device may be system information required by the first terminal device, and the system information required by the first terminal device is a part or all of system information delivered by a network device of a camped-on cell or a serving cell of the second terminal device.

The system information required by the first terminal device includes changed system information in the system information required by the first terminal device or all system information required by the first terminal device, and therefore the second terminal device does not need to send all the system information to the first terminal device, and sends only the changed system information to the first terminal device, thereby reducing signaling overheads of sending system information between the first terminal device and the second terminal device.

The second terminal device may obtain the changed system information in one of the following manners: The network device indicates the changed system information in a paging message, and the second terminal device may determine the changed system information by receiving a paging message sent by the network device. The network device indicates the changed system information in a system information block (SIB) message, such as an SIB1 message, and the second terminal device may determine the changed system information by receiving a SIB1 message sent by the network device. The second terminal device receives system information sent by the network device and compares the newly received system information with currently stored original system information, to further determine the changed system information.

In still another possible implementation, the second terminal device may send indication information to the first terminal device, where the indication information is used to indicate that the system information changes. When determining that the system information changes, the first terminal device receives the system information sent by the second terminal device, so that the first terminal device receives the system information only when the first terminal device needs to receive the system information, thereby reducing signaling overheads.

In still another possible implementation, the on duration of the first terminal may be a time in which the second terminal device sends a discovery message, and the system information is carried in the discovery message sent by the second terminal device.

The system information may be carried in a reserved bit in an existing discovery message, or the system information may be carried in a discovery message that is used for carrying the system information. A bit in the discovery message that is used for carrying the system information may carry the system information and carry some necessary information such as a destination address.

The second terminal sends, to the first terminal device, the discovery message that carries the system information, and the first terminal may obtain the system information by receiving the discovery message sent by the second terminal device, so that the first terminal device can receive the system information through a sidelink between the first terminal device and the second terminal device without a need to maintain a cellular link, thereby reducing complexity and power consumption of system information transmission.

In still another possible implementation, the on duration of the first terminal device may be a time in which the device is in an RRC connected mode and may receive a message sent by the second terminal device. The time in which the device may receive the message sent by the second terminal device may be understood as a time in which the first terminal device monitors a sidelink, and the monitoring a sidelink may be monitoring a physical sidelink control channel (PSCCH), a physical sidelink shared channel (PSSCH), a physical sidelink discovery channel (PSDCH), a physical sidelink broadcast channel (PSBCH), or the like. The network device determines that the system information changes, adds the system information required by the first terminal device to an RRC message, and forwards the RRC message to the second terminal device. The RRC information that carries the system information required by the first terminal device may be an RRC dedicated message. Further, the RRC dedicated message that carries the system information required by the first terminal device may be an RRC reconfiguration message.

To reduce signaling overheads of requesting a resource and allocating a resource by the second terminal device, when or after sending, to the second terminal device, the RRC message that carries the system information required by the first terminal device, the network device may configure a resource that is used to forward the RRC message.

The second terminal device forwards, to the first terminal device, the RRC message that is sent by the network device and that carries the system information, and the first terminal obtains the system information by receiving the RRC message forwarded by the second terminal device, so that the first terminal device can receive the system information through a sidelink between the first terminal device and the second terminal device without a need to maintain a cellular link, thereby reducing complexity and power consumption of system information transmission. In addition, in the solution in which the system information is carried in the RRC message, regardless of whether the first terminal device is in coverage of a cell or is out of coverage of a cell, the first terminal device can obtain the system information as long as the first terminal device is in an RRC connected mode. An implementation process is simple, and an existing standard protocol is slightly changed, thereby reducing signaling overheads and resource waste.

According to a second aspect, a system information transmission method is provided. A second terminal device determines that system information required by a first terminal device changes; the second terminal device sends, to the first terminal device, indication information that is used to indicate that the system information changes; and the first terminal device receives the indication information sent by the second terminal device, and obtains the system information according to the indication information.

In a possible implementation, the first terminal device may receive the system information through a sidelink between the first terminal device and the second terminal device.

In another possible implementation, if the first terminal device has only one receive radio frequency chain (RX chain), the first terminal device may obtain the system information within a gap period of communication between the second terminal device and the first terminal device through a link between the first terminal device and a network device. Communication between the second terminal device and the first terminal device is suspended within the gap period. The second terminal device and the first terminal device may still communicate with each other through a sidelink outside the gap period.

In a possible implementation, if the first terminal device is in an RRC idle mode, the gap period may be configured by the first terminal device or may be configured or preconfigured by the second terminal device.

If the first terminal device is in an RRC idle mode, the gap period is any time period in a sleep time of the first terminal device.

In another possible implementation, if the first terminal device is in an RRC connected mode, the gap period may be configured by the second terminal device or the network device for the first terminal device. The gap period configured by the second terminal device or the network device for the first terminal device may be one or more modification periods, or may be periods of some system information windows, or may be a periodically repeated time period, or may be another customized time period.

In still another possible implementation, in addition to sending, to the first terminal device, the indication information that is used to indicate that the system information changes, the second terminal device may indicate the changed system information to the first terminal, for example, adding the changed system information to a paging message or a SIB1 message, so that the first terminal device needs to receive only the system information required by the first terminal device, and does not need to receive all system information, thereby reducing signaling overheads. The second terminal device may indicate a type of the changed system information by using the indication information, so that the first terminal device receives system information of this type.

In still another possible implementation, to enable the first terminal device to accurately and quickly switch to a cellular link to obtain the system information, before the first terminal device obtains the system information through the link between the first terminal device and the network device, the first terminal device may obtain a cell identifier of a cell in which the second terminal device is located.

According to a third aspect, a system information transmission apparatus is provided. The system information transmission apparatus can implement a function of the first terminal in the method embodiment in the first aspect. The function may be implemented by hardware, or may be implemented by hardware executing corresponding software. The hardware or the software includes one or more modules corresponding to the foregoing function. The module may be software and/or hardware.

In a possible embodiment, the first terminal device includes a processing unit and a receiving unit, and functions of the processing unit and the receiving unit may be corresponding to the method steps. Details are not described herein again.

In another possible embodiment, the first terminal device includes a processor, a memory, and a receiver, and the processor, the memory, and the receiver may be connected to each other through a bus system. The memory is configured to store a program, and the processor is configured to execute the program in the memory, to perform the method performed by the first terminal device in the first aspect or any possible embodiment of the first aspect.

According to a fourth aspect, a system information transmission apparatus is provided. The system information transmission apparatus can implement a function of the first terminal in the method embodiment in the second aspect. The function may be implemented by hardware, or may be implemented by hardware executing corresponding software. The hardware or the software includes one or more modules corresponding to the foregoing function. The module may be software and/or hardware.

In a possible embodiment, the first terminal device includes a receiving unit and a processing unit, and functions of the receiving unit and the processing unit may be corresponding to the method steps. Details are not described herein again.

In another possible embodiment, the first terminal device includes a processor, a memory, and a receiver, and the processor, the memory, and the receiver may be connected to each other through a bus system. The memory is configured to store a program, and the processor is configured to execute the program in the memory, to perform the method performed by the first terminal device in the second aspect or any possible embodiment of the second aspect.

According to a fifth aspect, a system information transmission apparatus is provided. The system information transmission apparatus can implement a function of the second terminal in the method embodiment in the first aspect. The function may be implemented by hardware, or may be implemented by hardware executing corresponding software. The hardware or the software includes one or more modules corresponding to the foregoing function. The module may be software and/or hardware.

In a possible embodiment, the second terminal device includes a processing unit and a sending unit, and functions of the processing unit and the sending unit may be corresponding to the method steps. Details are not described herein again.

In another possible embodiment, the second terminal device includes a processor, a memory, and a transmitter, and the processor, the memory, and the transmitter may be connected to each other through a bus system. The memory is configured to store a program, and the processor is configured to execute the program in the memory, to perform the method performed by the second terminal device in the first aspect or any possible embodiment of the first aspect.

According to a fourth aspect, a system information transmission apparatus is provided. The system information transmission apparatus can implement a function of the second terminal in the method embodiment in the second aspect. The function may be implemented by hardware, or may be implemented by hardware executing corresponding software. The hardware or the software includes one or more modules corresponding to the foregoing function. The module may be software and/or hardware.

In a possible embodiment, the first terminal device includes a processing unit and a sending unit, and functions of the processing unit and the sending unit may be corresponding to the method steps. Details are not described herein again.

In another possible embodiment, the first terminal device includes a processor, a memory, and a transmitter, and the processor, the memory, and the transmitter may be connected to each other through a bus system. The memory is configured to store a program, and the processor is configured to execute the program in the memory, to perform the method performed by the second terminal device in the second aspect or any possible embodiment of the second aspect.

According to a sixth aspect, an embodiment provides a communications system, and the communications system includes the first terminal device in the second aspect and the second terminal device in the fourth aspect, or includes the first terminal device in the third aspect or the second terminal device in the fifth aspect.

According to a seventh aspect, an embodiment provides a computer readable storage medium or a computer program product, configured to store a computer program. The computer program is used to perform the method in the first aspect and any possible embodiment of the first aspect and in the second aspect and any possible embodiment of the second aspect.

According to the system information transmission method and apparatus provided in the embodiments, when cell system information changes, the first terminal device receives, during the on duration of the first terminal device, the system information sent by the second terminal device, so that the first terminal device can receive the system information through the sidelink between the first terminal device and the second terminal device without a need to maintain the cellular link, thereby reducing complexity and power consumption of system information transmission. Alternatively, when cell system information changes and the first terminal device has only one RX chain, the first terminal device may obtain the system information within the gap period of communication between the second terminal device and the first terminal device through the link between the first terminal device and the network device. Communication between the second terminal device and the first terminal device is suspended within the gap period, so that the changed system information can be received through the cellular link. In addition, the first terminal device may maintain the cellular link only within the gap period, and does not need to maintain the cellular link within a period other than the gap period, thereby reducing complexity and power consumption of system information transmission to some extent.

DESCRIPTION OF EMBODIMENTS

The following describes embodiments with reference to accompanying drawings.

A system information transmission method provided in the embodiments may be applied to a communication scenario in which two devices directly communicate with each other. In the embodiments, devices that directly communicate with each other may include various handheld devices, in-vehicle devices, wearable devices, or computing devices with a wireless communication function, or other processing devices connected to a wireless modem, and UE in various forms, mobile stations in various forms, terminals in various forms, terminal devices (terminal equipment) in various forms, and the like. For ease of description, the devices that directly communicate with each other are referred to as terminal devices below in the embodiments.

Figure 1:
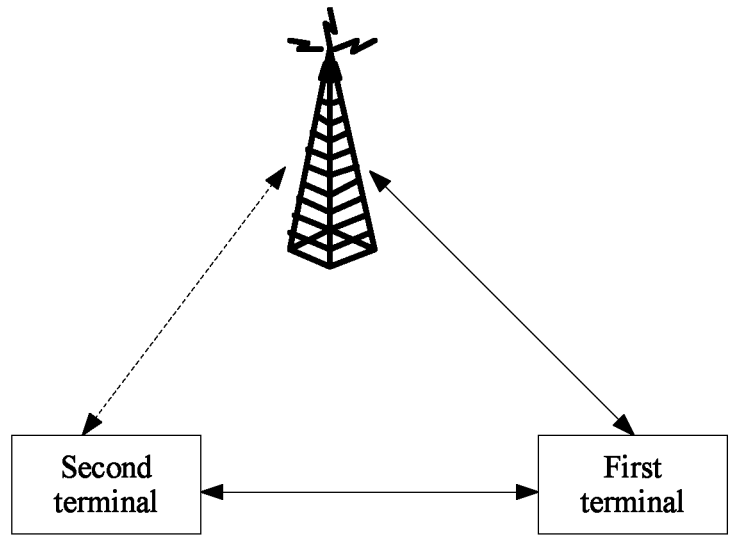
FIG. 1 is a schematic architectural diagram of an application scenario of a system information transmission method according to an embodiment.

A UE-to-network relay scenario is a typical application scenario in which two devices directly communicate with each other. FIG. 1 is a schematic architectural diagram of the UE-to-network relay scenario. In the application scenario shown in FIG. 1, a link between a network device and a first terminal device and a link between the network device and a second terminal device may be referred to as a cellular link or may be referred to as an uplink and a downlink, and a link between the first terminal device and the second terminal device may be referred to as a sidelink. In an exemplary embodiment, the second terminal device is a terminal device that directly interacts with the network device and may also be referred to as a relay terminal device, and the first terminal device is a terminal device that communicates with the network device by using the second terminal device and may also be referred to as a remote terminal device. In existing layer 3 UE-to-network relay communication, control signaling of the first terminal device may interact with the network device through a cellular link, and user data of the first terminal device may interact with the network device through a sidelink. That is, user data between the first terminal device and the network device may be forwarded to the first terminal device by using the second terminal device, or user data between the second terminal device and the network device may be forwarded to the network device by using the first terminal device. In layer 2 UE-to-network relay communication, both control signaling and user data of the second terminal device may interact with the network device through a sidelink.

It may be understood that the network device in FIG. 1 is an apparatus that is deployed in a radio access network and provides a wireless communication function for a terminal, and may be a base station, for example, may include various forms such as a macro base station, a micro base station, a relay station, and an access point. In a system using different radio access technologies, a name of a device with a base station function may vary. For example, the device is referred to as an evolved NodeB (eNB or eNodeB) in a long term evolution (LTE) network, or is referred to as a NodeB in a third generation 3G network. For ease of description the network device that communicates with the first terminal device and the second terminal device is referred to as a base station below.

Based on the application scenario shown in FIG. 1, if system information of a camped-on cell or a serving cell of the first terminal device and the second terminal device changes, or handover occurs between the first terminal device and the second terminal device, it may be understood that cell system information changes. In this case, the first terminal device and the second terminal device need to re-obtain the system information. The serving cell is a cell to which a terminal device is connected when the terminal device is in a RRC connected mode. The camped-on cell is a cell on which a terminal device camps when the terminal device is in an RRC idle mode. The system information is a message that is periodically broadcasted by the base station to all terminal devices in a cell on a broadcast channel. The system information is classified into a master information block (MIB) and a number of SIBs. The MIB includes a limited quantity of most important and commonly used transmission parameters for reading other cell information. The system information block includes other required parameters, including 20 SIBs: SIB1 to SIB20.

Based on the exemplary scenario shown in FIG. 1, for the first terminal device, if a connection is established between the first terminal device and the second terminal device, it may be considered that the first terminal device may camp on the second terminal device connected to the first terminal device. When the cell system information changes, the first terminal device may obtain the system information through a cellular link or may obtain the system information by using the second terminal device.

In an embodiment, when cell system information changes, the first terminal device receives, during on duration of the first terminal device, system information sent by the second terminal device, so that the first terminal device can receive the system information through a sidelink between the first terminal device and the second terminal device without a need to maintain a cellular link, thereby reducing complexity and power consumption of system information transmission.

In another embodiment, when cell system information changes and the first terminal device has only one RX chain, the first terminal device may obtain system information within a gap period between the second terminal device and the first terminal device through a link between the first terminal device and the base station. Communication between the second terminal device and the first terminal device is suspended within the gap period, so that the changed system information can be received through a cellular link. In addition, the first terminal device may maintain the cellular link only within the gap period, and does not need to maintain the cellular link within a period other than the gap period, thereby reducing complexity and power consumption of system information transmission to some extent.

It may be understood that the system information transmission method provided in the embodiments is not limited to the application scenario shown in FIG. 1, and may also be applied to an application scenario in which two other devices directly communicate with each other, for example, a short-range communication scenario in which a Bluetooth technology or a wireless fidelity (WiFi) technology is used.

The following describes an exemplary implementation method in which the first terminal device receives the system information by using the second terminal device or the cellular link with reference to an exemplary application in the embodiments.

Figure 2:
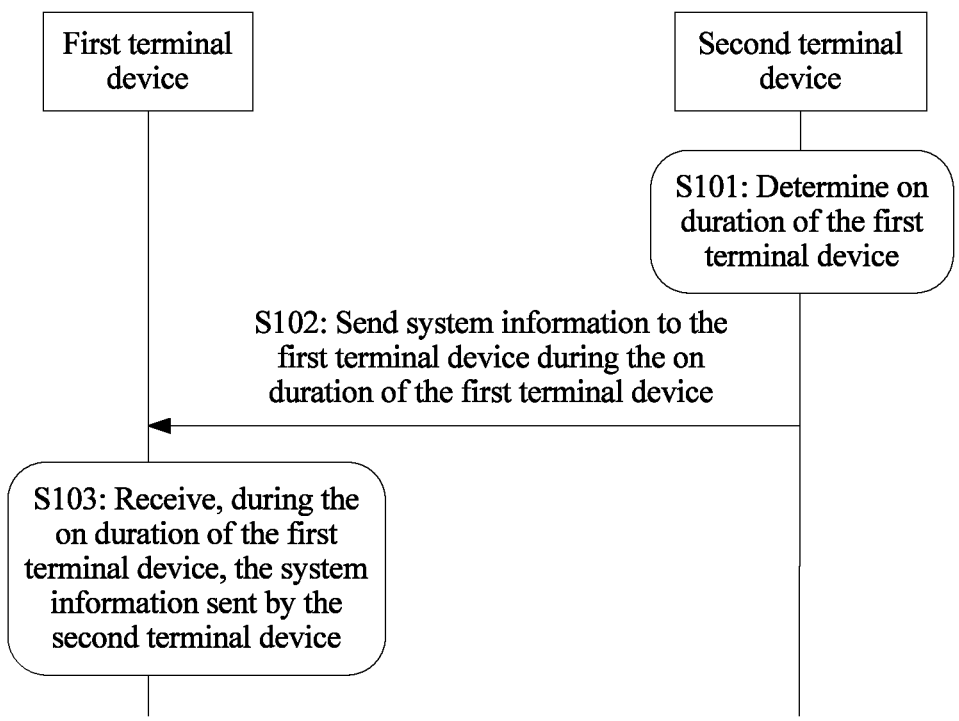
FIG. 2 is an implementation flowchart of a system information transmission method according to an embodiment.

FIG. 2 is an implementation flowchart of a system information transmission method according to an embodiment. Referring to FIG. 2, the method includes the following steps.

In step S101, a second terminal device determines on duration of a first terminal device.

The on duration of the first terminal device is a time in which the first terminal device may send and receive a message. For example, the on duration may be a paging occasion of the first terminal device in an RRC idle mode, or may be a time in which the first terminal device receives a discovery message sent by the second terminal device, or may be a time in which the first terminal device in an RRC connected mode receives a message sent by the second terminal device, including a time in which the first terminal device that is in an RRC connected mode and is configured with discontinuous reception (DRX) is in DRX on duration, or may be another time in which the first terminal device may receive a message sent by the second terminal device. That the second terminal device determines the on duration of the first terminal device may be understood as that the second terminal device calculates the on duration of the first terminal device, or the second terminal device obtains a configuration of the on duration of the first terminal device.

In step S102, the second terminal device sends system information to the first terminal device during the on duration of the first terminal device.

In step S103, the first terminal device receives, during the on duration of the first terminal device, the system information sent by the second terminal device.

A part of system information delivered by a base station of a camped-on cell or a serving cell of the second terminal device is required by all first terminal devices that complete establishment of a direct link to the second terminal device. In this embodiment, this part of system information may be referred to as basic system information, for example, cell access related information (IE) in a SIB1. Another part of system information delivered by the base station of the camped-on cell or the serving cell of the second terminal device has different requirements for first terminal devices of different types, capabilities, and service requirements. In this embodiment, this part of system information may be referred to as specific system information. For example, system information required by a first terminal device that supports extended access control (extended access class barring, EAB) is a SIB14; system information required by a first terminal device that supports a multimedia broadcast multicast service (MBMS) is a SIB13, a SIB15, and the like; and system information required by a first terminal device that supports collaboration between a universal mobile telecommunications system (UMTS) evolved universal terrestrial radio access network (E-UTRAN) and a wireless local area network (WLAN) is a SIB17, and the like. A first terminal device may not require specific system information, and specific system information required by different first terminal devices may be the same or partially the same.

System information that needs to be obtained by a first terminal device includes basic system information and specific system information required by the first terminal device, and the first terminal device does not need to obtain specific system information of another first terminal device. To reduce signaling overheads of transmitting system information between the first terminal device and the second terminal device, the second terminal device may send, to the first terminal device, system information required by the first terminal device, where the system information required by the first terminal device may be a part or all of system information delivered by the base station of the camped-on cell or the serving cell of the second terminal device. The second terminal device may store specific system information required by the first terminal device. The system information required by the first terminal device may be changed system information in the system information required by the first terminal device or all system information required by the first terminal device.

When sending the system information to the first terminal device during the on duration of the first terminal device, the second terminal device may send the system information by using a broadcast address, in other words, send the system information to the first terminal device in a broadcast manner, so that all first terminal devices connected to the second terminal device can receive the system information. The second terminal device may alternatively send the system information to the first terminal device by using a multicast address, in other words, send the system information to the first terminal device in a multicast manner, so that some first terminal devices connected to the second terminal device can receive the system information. The second terminal device may alternatively send the system information to the first terminal device by using a unicast address, in other words, send the system information to the first terminal device in a unicast manner, so that a first terminal device connected to the second terminal device can receive the system information sent by the second terminal device.

In this embodiment, when cell system information changes, the first terminal device receives, during the on duration of the first terminal device, the system information sent by the second terminal device, so that the first terminal device can receive the system information through a sidelink between the first terminal device and the second terminal device without a need to maintain a cellular link, thereby reducing complexity and power consumption of system information transmission.

With reference to actual application, the embodiments describe an implementation process of transmitting system information between the second terminal device and the first terminal device in various scenarios in which the on duration of the first terminal is the paging occasion of the first terminal device, the on duration of the first terminal is a time in which the second terminal device sends the discovery message, and the on duration of the first terminal is a time in which the first terminal device is in an RRC connected mode and may receive the message sent by the second terminal device.

First, for a scenario in which on duration of a first terminal is a paging occasion of the first terminal device, an implementation process in which a second terminal sends system information to the first terminal device on the paging occasion of the first terminal device, and the first terminal device receives, on the paging occasion of the first terminal, the system information sent by the second terminal device is described.

Figure 3:
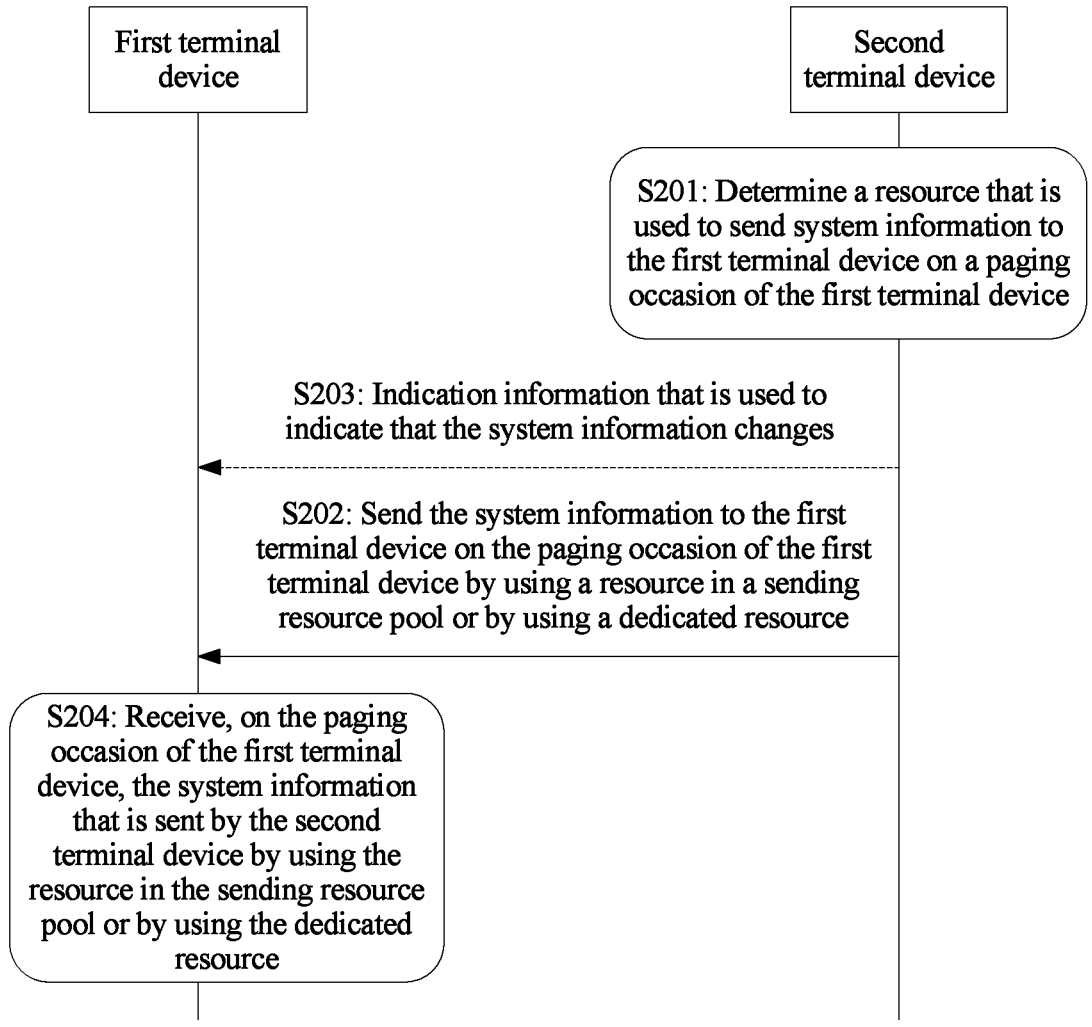
FIG. 3 is an implementation flowchart of a method for transmitting system information by a first terminal device and a second terminal device on a paging occasion according to an embodiment.

FIG. 3 is an implementation flowchart of a method for transmitting system information by a first terminal device and a second terminal device on a paging occasion according to an embodiment. As shown in FIG. 3, the method includes the following steps.

In step S201, a second terminal device determines a resource that is used to send system information to a first terminal device on a paging occasion of the first terminal device.

In an implementation, the second terminal device may send the system information to the first terminal device by using a dedicated resource.

The dedicated resource is determined by a base station based on a dedicated resource requested by the second terminal device from the base station and a time domain location that is of the paging occasion and that is indicated by the second terminal device to the base station.

The second terminal device may request the dedicated resource from the base station, and indicate the time domain location of the paging occasion, and the second terminal device indicates the time domain location of the paging occasion to the base station, so that the base station allocates the dedicated resource to the paging occasion corresponding to the time domain location. The second terminal device indicating the time domain location of the paging occasion to the base station may be: the second terminal device may indicate, to the base station, an S-temporary mobile subscriber identity (s-TMSI), a user equipment-specific discontinuous reception cycle (UE-specific DRX cycle), or a specific subframe index such as 0, 4, 5, or 9, and other information that may be used to determine the time domain location of the paging occasion, and the base station may determine the time domain location of the paging occasion by using the indicated information. The implementation in which the second terminal device uses the dedicated resource is applicable to a scenario in which the second terminal device is in an RRC connected mode.

In another implementation, the second terminal device may use a resource in a sending resource pool that is configured or preconfigured by a base station by using a broadcast message as a resource that is used by the second terminal device to send the system information to the first terminal device.

In this embodiment, a time domain location of the resource that is in the sending resource pool and that is used by the second terminal device overlaps with a time domain location of the paging occasion of the first terminal device, so that when the second terminal device sends the system information by using the resource in the sending resource pool, the first terminal device can receive the system information sent by the second terminal device.

The resource in the sending resource pool may be a resource that is used by the second terminal device to send a paging message. The second terminal device may directly send the system information by using a resource that is used by a paging message originally sent by the second terminal device, and use the sending resource used by the original paging message as the resource in the sending resource pool. The second terminal device may alternatively add the system information to the original paging message to obtain a new paging message, and use a sending resource used by the new paging message as the resource in the sending resource pool.

The resource in the sending resource pool may be alternatively a resource that is used by the second terminal device to send the system information to the first terminal device. When a sending resource pool that is used to send the system information is allocated to the second terminal device, the base station may schedule a resource in the resource pool to another terminal device for use when the second terminal device does not use the resource (when the system information does not change), thereby reducing resource waste.

In this embodiment, when the base station configures the sending resource pool for the second terminal device, the second terminal device may be in an RRC connected mode or an RRC idle mode. Regardless of whether the second terminal device is in an RRC connected mode or an RRC idle mode, the second terminal device can select, from the sending resource pool, a resource used for sending the system information.

In step S202, the second terminal device sends the system information to the first terminal device on the paging occasion of the first terminal device by using a resource in a sending resource pool or by using a dedicated resource, where the sending resource pool is configured or preconfigured by a base station by using a broadcast message, and the dedicated resource is configured by the base station for the second terminal device.

In this embodiment, the second terminal device may send the system information on one or more paging occasions of the first terminal device, to ensure that the first terminal device can receive the system information sent by the second terminal device. The second terminal device may send the system information on the one or more paging occasions of the first terminal device in a broadcast manner, or the second terminal device may send the system information on the one or more paging occasions of the first terminal device in a multicast manner, or the second terminal device may send the system information on the one or more paging occasions of the first terminal device in a unicast manner.

In this embodiment, the second terminal device may send only changed system information to the first terminal device, thereby reducing signaling overheads. The second terminal device may obtain the changed system information in one of the following manners:

A: The base station indicates the changed system information in a paging message, and the second terminal device may determine the changed system information by receiving a paging message sent by the base station. The base station may indicate the changed system information in the paging message in the following manner: extending IE system info modification to indicate the changed system information in content of the IE system info modification; or newly adding an IE to indicate the changed system information in content of the newly added IE.

B: The base station indicates the changed system information in a SIB1 message, and the second terminal device may determine the changed system information by receiving a SIB1 message sent by the base station. The base station may indicate the changed system information in the SIB1 message in the following manner: extending IE system info value tag to indicate the changed system information in content of the IE system info value tag; or newly adding an IE to indicate the changed system information in content of the newly added IE.

C: The second terminal device receives system information sent by the base station and compares the newly received system information with currently stored original system information, to further determine the changed system information.

In the two manners A and B of determining the changed system information, the second terminal device may receive only the changed system information without a need to compare system information, thereby reducing power consumption.

In this embodiment, the method may further include the following step S203:

In step S203, the second terminal device sends indication information to the first terminal device, where the indication information is used to indicate that the system information changes. The indication information may indicate that the system information changes, or indicate a primary notification and/or a secondary notification of an earthquake and tsunami warning system (ETWS), or indicate a commercial mobile alert service (CMAS) notification, or indicate that an EAB parameter changes, or the like. The indication information may be carried in a paging message, or may be carried in a discovery message, or may be carried in a newly added message. In this embodiment, S203 is an optional step. When step S203 is included, the second terminal device sends, to the first terminal device, the indication information that is used to indicate that the system information changes, so that the first terminal device receives the system information only when the first terminal device needs to receive the system information, thereby reducing signaling overheads.

In step S204, the first terminal device determines the paging occasion of the first terminal device, and receives, on the paging occasion of the first terminal device, the system information sent by the second terminal device by using the resource in the sending resource pool or by using the dedicated resource.

In this embodiment, the second terminal device sends the system information to the first terminal device on the paging occasion of the first terminal device, so that the first terminal device can receive the system information through a sidelink between the first terminal device and the second terminal device without a need to maintain a cellular link, thereby reducing complexity and power consumption of system information transmission. In addition, the second terminal device sends the system information to the first terminal device on the paging occasion of the first terminal device, and regardless of whether the first terminal device is in an RRC connected mode or an RRC idle mode, the first terminal device can receive the system information sent by the second terminal device. This embodiment can be applied to wide scenarios.

Second, in an embodiment, for a scenario in which on duration of a first terminal is a time in which the second terminal device sends a discovery message, an exemplary process in which the second terminal adds system information to the discovery message sent by the second terminal device and sends the discovery message to the first terminal device, and the first terminal obtains the system information by receiving the discovery message sent by the second terminal device is described.

Figure 4:
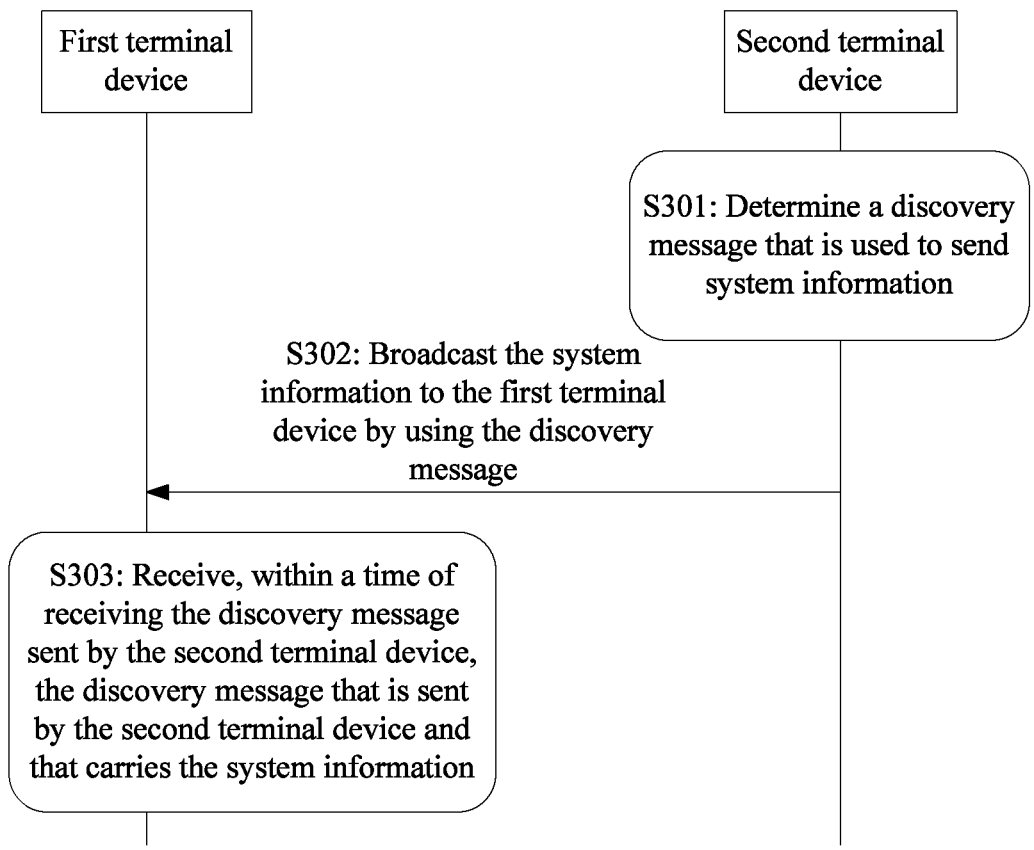
FIG. 4 is an implementation flowchart of a method for transmitting system information by a first terminal device and a second terminal device by using a discovery message according to an embodiment.

FIG. 4 is an implementation flowchart of a method for transmitting system information by a first terminal device and a second terminal device by using a discovery message according to an embodiment. As shown in FIG. 4, the method includes the following steps.

In step S301 a second terminal device determines a discovery message that is used to send system information.

In this embodiment, the second terminal device may add the system information to a reserved bit in an existing discovery message, or the second terminal device may establish a discovery message that is used for carrying the system information. A bit in the discovery message that is used for carrying the system information may carry the system information and carry some necessary information such as a destination address.

In this embodiment, the second terminal device may add the system information to one or more discovery messages.

In step S302, the second terminal device broadcasts the system information to a first terminal device by using the discovery message.

In step S303, the first terminal device receives, within a time of receiving the discovery message sent by the second terminal device, the discovery message that is sent by the second terminal device and that carries the system information. The first terminal device needs to receive the discovery message regardless of whether the first terminal device is in an RRC connected mode or an RRC idle mode.

In this embodiment, the second terminal device adds the system information to the discovery message and sends the discovery message to the first terminal device, so that the first terminal device can receive the system information through a sidelink between the first terminal device and the second terminal device without a need to maintain a cellular link, thereby reducing complexity and power consumption of system information transmission.

Third, in an embodiment, for a scenario in which on duration of a first terminal device is a time in which the first terminal device in an RRC connected mode receives a message sent by a second terminal device, including a time in which the first terminal device that is in an RRC connected mode and that is configured with DRX is in DRX on duration, an implementation process in which the second terminal device forwards, to the first terminal device, an RRC message that is sent by a base station and that carries system information, and the first terminal obtains the system information by receiving the RRC message that is sent by the base station and that is forwarded by the second terminal device is described.

Figure 5:
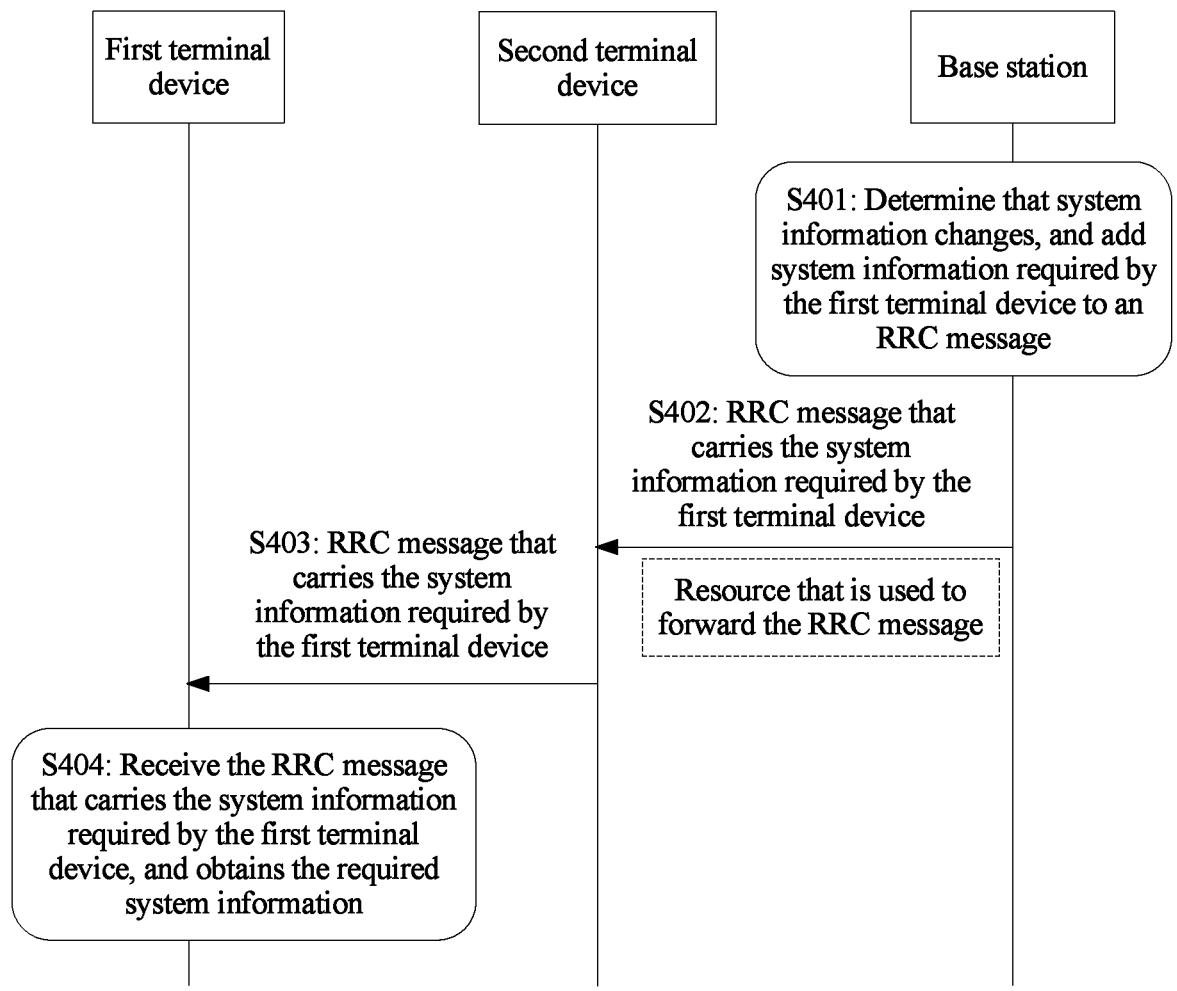
FIG. 5 is an implementation flowchart of a method for transmitting system information by a first terminal device and a second terminal device by using an RRC message according to an embodiment.

FIG. 5 is an implementation flowchart of a method for transmitting system information by a first terminal device and a second terminal device by using an RRC message according to an embodiment. As shown in FIG. 5, the method includes the following steps.

In step S401, a base station determines that system information changes, and adds system information required by a first terminal device to an RRC message.

The RRC message that carries the system information required by the first terminal device may be an RRC dedicated message.

The system information required by the first terminal device may be carried in an RRC reconfiguration message in the RRC dedicated message, and the RRC reconfiguration message that carries the system information required by the first terminal device may be sent to the first terminal device by using a layer 2 relay protocol stack.

In step S402, the base station sends, to a second terminal device, the RRC message that carries the system information required by the first terminal device.

In step S403, the second terminal device receives the RRC message sent by the base station, and forwards, to the first terminal device, the RRC message that carries the system information required by the first terminal device.

In step S404, the first terminal device receives the RRC message that carries the system information required by the first terminal device, and obtains the required system information.

In this embodiment, the second terminal device needs to obtain a resource that is used to forward the RRC message to the first terminal device. To reduce signaling overheads of requesting a resource and allocating a resource by the second terminal device, the base station may configure, for the RRC message that is sent to the second terminal device and that carries the system information required by the first terminal device, the resource that is used to forward the RRC message.

In this embodiment, the second terminal device forwards, to the first terminal device, the RRC message that is sent by the base station and that carries the system information, so that the first terminal device can receive the system information through a sidelink between the first terminal device and the second terminal device without a need to maintain a cellular link, thereby reducing complexity and power consumption of system information transmission. In addition, in the solution in which the system information is carried in the RRC message, regardless of whether the first terminal device is in coverage of a cell or is out of coverage of a cell, the first terminal device can obtain the system information in this manner as long as the first terminal device is in an RRC connected mode. An implementation process is simple, and an existing standard protocol is slightly changed, thereby reducing signaling overheads and resource waste.

In this embodiment, when cell system information changes, and the second terminal device determines that the cell system information changes, the second terminal device may send a direct link release message (DIRECT_COMMUNICATION_RELEASE) to the first terminal device in an RRC idle mode, and indicate that a reason for releasing a link is that the system information changes. After receiving the direct link release message, the first terminal device determines, based on the direct link release message, that the system information changes. The first terminal device releases a direct link between the first terminal device and the second terminal device, re-establishes the direct link between the first terminal device and the second terminal device, and obtains the changed system information when or after the direct link between the first terminal device and the second terminal device is re-established, or a camped-on cell or a serving cell that camps on the second terminal device receives the changed system information through a cellular link.

In another embodiment, when cell system information changes and the first terminal device has only one RX chain, the first terminal device may obtain the system information within a gap period of communication between the second terminal device and the first terminal device through a link between the first terminal device and the base station.

Figure 6:
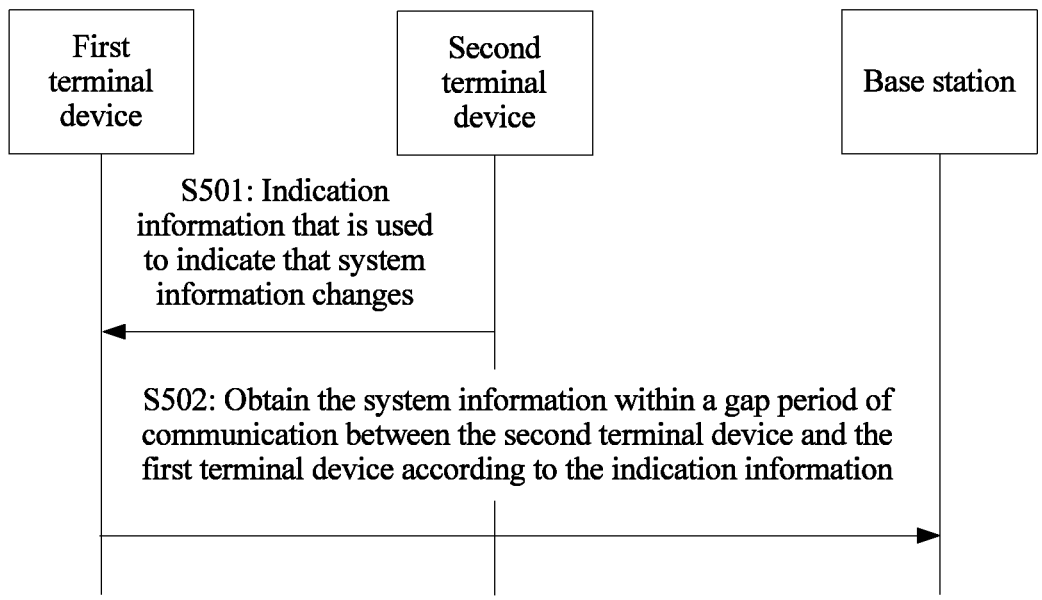
FIG. 6 is another implementation flowchart of a system information transmission method according to an embodiment.

FIG. 6 is another implementation flowchart of a system information transmission method according to an embodiment. As shown in FIG. 6, the method includes the following steps.

In step S501, a second terminal device determines that system information required by a first terminal device changes, and the second terminal device sends indication information to the first terminal device, where the indication information is used to indicate that the system information changes.

The indication information may indicate that the system information changes, or indicate a primary notification and/or a secondary notification of an ETWS, or indicate a CMAS notification, or indicate that an EAB parameter changes, or the like. The indication information may be carried in a paging message, or may be carried in a discovery message, or may be carried in a newly added message.

The indication information may be a paging message that is sent by the second terminal device to the first terminal device and that is used to indicate that the system information changes. The paging message that is used to indicate that the system information changes may include IE system info modification and IE system info modification is set to true, to indicate that the system information changes. The paging message that is used to indicate that the system information changes may further include IE ETWS-Indication and IE ETWS-Indication is set to true to indicate that ETWS system information changes. Alternatively, the paging message that is used to indicate that the system information changes may further include IE CMAS-Indication and IE CMAS-Indication is set to true to indicate that CMAS-system information changes, or the paging message that is used to indicate that the system information changes may further include IE EAB-Param Modification and IE EAB-Param Modification is set to true to indicate that EAB system information changes.

In step S502, the first terminal device receives the indication information sent by the second terminal device and obtains the system information according to the indication information.

The first terminal device may receive the system information through a sidelink between the first terminal device and the second terminal device according to the indication information.

If the first terminal device has only one RX chain, the first terminal device may obtain the system information according to the indication information within a gap period of communication between the second terminal device and the first terminal device through a link between the first terminal device and a base station. Communication between the second terminal device and the first terminal device is suspended within the gap period. The second terminal device and the first terminal device may still communicate with each other through the sidelink outside the gap period. It should be noted that the gap period is to distinguish between a time of communication between the first terminal device and the second terminal device and a time of communication between the first terminal device and the base station. It may be understood that, in another possible implementation, the second terminal device communicates with the first terminal device within the gap period, and communication between the second terminal device and the first terminal device is suspended within the gap period.

In this embodiment, if the first terminal device is in an RRC idle mode and has no data service, the gap period may be configured by the first terminal device, or may be configured or preconfigured by the second terminal device. A time domain location of the gap period configured by the first terminal device does not overlap with a time domain location of on duration of the first terminal device such as a paging occasion of the first terminal, in other words, the first terminal device may select any time period in a sleep time of the first terminal device as the gap period, and switch to a cellular link within the gap period to receive the system information. A time domain location of the gap period configured by the second terminal device does not overlap with a time domain location of on duration of the first terminal device such as a paging occasion of the first terminal, in other words, the second terminal device may select any time period in a sleep time of the first terminal device as the gap period, and switch to a cellular link within the gap period to receive the system information.

If the first terminal device is in an RRC connected mode, the gap period may be configured by the second terminal device or the base station for the first terminal device. If the gap period is configured by the base station, the base station needs to forward configuration information of the gap period to the second terminal device. If the gap period is configured by the second terminal device, the second terminal device may send configuration information of the gap period to the base station. The second terminal device or the base station may control not to send data to the first terminal device within the gap period, or the second terminal device or the base station may control not to schedule the first terminal device within the gap period. The gap period configured by the second terminal device or the base station for the first terminal device may be one or more modification periods, or may be periods of some system information windows (SI window), or may be a periodically repeated time period, or may be another customized time period.

In a possible implementation, to enable the first terminal device to accurately and quickly switch to a cellular link to obtain the system information, the first terminal device needs to obtain a cell identifier of a serving cell of the second terminal device. Therefore, in this embodiment, before the system information is obtained through the link between the first terminal device and the base station, the first terminal device may obtain a cell identifier of a cell in which the second terminal device is located. In addition to obtaining the cell identifier, the first terminal device may obtain other assistance information that helps the first terminal device quickly find the cell in which the second terminal device is located.

In another possible implementation, in addition to sending, to the first terminal device, the indication information that is used to indicate that the system information changes, the second terminal device may indicate the changed system information to the first terminal, for example, one or more SIBs change or one or more IEs in a SIB change, and the changed system information may be carried in the indication information, so that the first terminal device needs to receive only the system information required by the first terminal device, and does not need to receive all system information, thereby reducing signaling overheads.

In this embodiment, when cell system information changes, and the first terminal device has only one RX chain, the first terminal device may suspend communication within the gap period of communication between the second terminal device and the first terminal device, and obtain the system information through the link between the first terminal device and the base station, to receive the changed system information through the cellular link. In addition, the first terminal device may maintain the cellular link only within the gap period, and does not need to maintain the cellular link within a period other than the gap period, thereby reducing complexity and power consumption of system information transmission to some extent.

The foregoing mainly describes the solutions provided in the embodiments from the perspective of interaction between the first terminal device and the second terminal device. It may be understood that to implement the foregoing functions, the first terminal device and the second terminal device include corresponding hardware structures and/or software units for performing the functions. With reference to the units and the algorithm steps in the examples described in the embodiments disclosed herein, the embodiments can be implemented by hardware or a combination of hardware and computer software. Whether a function is performed by hardware or hardware driven by computer software depends on particular applications and design constraints of the technical solutions. A person of ordinary skill in the art may use different methods to implement the described functions for each particular application, but it should not be considered that the implementation falls beyond the scope of the technical solutions in the embodiments.

In the embodiments, functional units of the first terminal device and the second terminal device may be obtained through division based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that in the embodiments, unit division is an example and is merely logical function division. In actual implementation, another division manner may be used.

Based on the same concept as the foregoing method embodiment, an embodiment provides a system information transmission apparatus.

Figure 7:
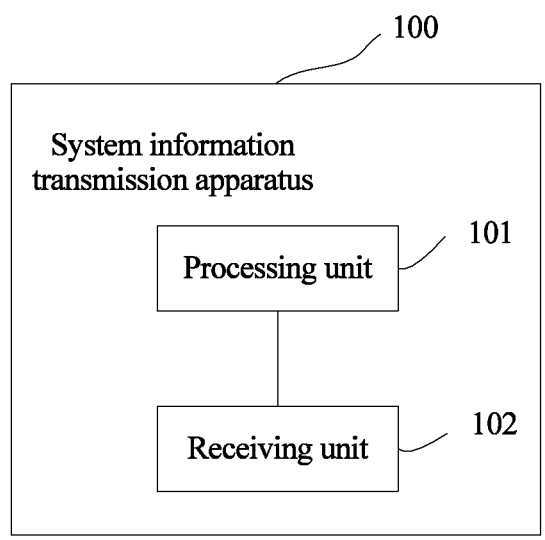
FIG. 7 is a schematic structural diagram of a system information transmission apparatus according to an embodiment.

When an integrated unit is used, FIG. 7 is a schematic diagram of a possible logical structure of a system information transmission apparatus 100. The system information transmission apparatus 100 may be applied to a first terminal device. Referring to FIG. 7, the system information transmission apparatus 100 applied to the first terminal device includes a processing unit 101 and a receiving unit 102. The processing unit 101 is configured to determine on duration of the first terminal device. The receiving unit 102 is configured to receive, during the on duration of the first terminal device determined by the processing unit 101, system information sent by a second terminal device.

The system information is system information required by the first terminal device, and the system information required by the first terminal device is a part or all of system information delivered by a base station of a camped-on cell or a serving cell of the second terminal device.

The system information required by the first terminal device includes changed system information in the system information required by the first terminal device or all system information required by the first terminal device.

In a possible implementation, the receiving unit 102 receives, on a paging occasion of the first terminal device, the system information sent by the second terminal device at least one time by using a resource in a sending resource pool, where the sending resource pool is configured or preconfigured by the base station by using a broadcast message.

The resource in the sending resource pool is a resource that is used by the second terminal device to send a paging message, or the resource in the sending resource pool is a resource that is used by the second terminal device to send the system information to the first terminal device.

In another possible implementation, the receiving unit 102 receives, on a paging occasion of the first terminal device, the system information sent by the second terminal device at least one time by using a dedicated resource, where the dedicated resource is configured by the base station for the second terminal device.

The dedicated resource is determined by the base station based on a dedicated resource requested by the second terminal device from the base station and an indicated time domain resource location of the paging occasion.

In still another possible implementation, the on duration of the first terminal device is a time in which the first terminal receives a discovery message sent by the second terminal device, and the system information is carried in the discovery message sent by the second terminal device.

In still another possible implementation, the on duration of the first terminal device is a time in which the first device is in an RRC connected mode and may receive a message sent by the second terminal device, and the system information is carried in an RRC message that is sent by the base station and that is forwarded by the second terminal device.

In still another possible implementation, the receiving unit 102 is further configured to:

before receiving the system information sent by the second terminal device, receive indication information sent by the second terminal device, where the indication information is used to indicate that the system information changes.

In still another possible implementation, the on duration of the first terminal device is a time in which the first terminal receives a discovery message sent by the second terminal device, and the system information is carried in the discovery message sent by the second terminal device.

When a form of hardware is used, the processing unit 101 may be a processor or a controller, and the receiving unit 102 may be a communications interface, a receiver, a transceiver circuit, or the like. The communications interface is a generic term, and may include one or more interfaces.

Figure 8:
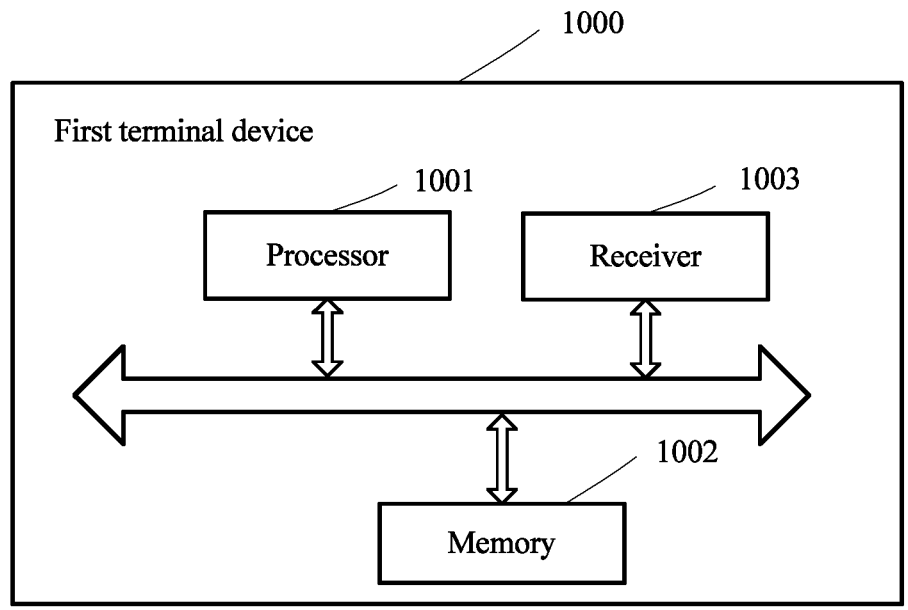
FIG. 8 is a schematic structural diagram of a first terminal according to an embodiment.

When the processing unit 101 is the processor and the receiving unit 102 is the receiver, the system information transmission apparatus 100 in this embodiment may be a first terminal device, as shown in FIG. 8. The first terminal device shown in FIG. 8 may be a wearable device.

FIG. 8 is a schematic diagram of a first terminal device 1000 according to an embodiment. The first terminal device 1000 may be configured to perform the method performed by the first terminal device in FIG. 2 through FIG. 5. As shown in FIG. 8, the first terminal device 1000 includes a processor 1001, a memory 1002, and a receiver 1003. The processor 1001, the memory 1002, and the receiver 1003 may be connected to each other through a bus system. The memory 1002 is configured to store a program, an instruction, or code. The processor 1001 is configured to execute the program in the memory 1002 to perform the following operations: controlling the receiver 1003 to receive, during on duration of the first terminal device, system information sent by a second terminal device, and implementing the steps and the functions implemented by the first terminal device in the foregoing implementations. Details are not described herein again.

For exemplary implementations of the processor 1001 and the receiver 1003, refer to exemplary descriptions of the processing unit 101 and the receiving unit 102 in the foregoing implementations in FIG. 7. Details are not described herein again.

Based on the same concept as the foregoing method embodiment, an embodiment further provides a system information transmission apparatus.

Figure 9:
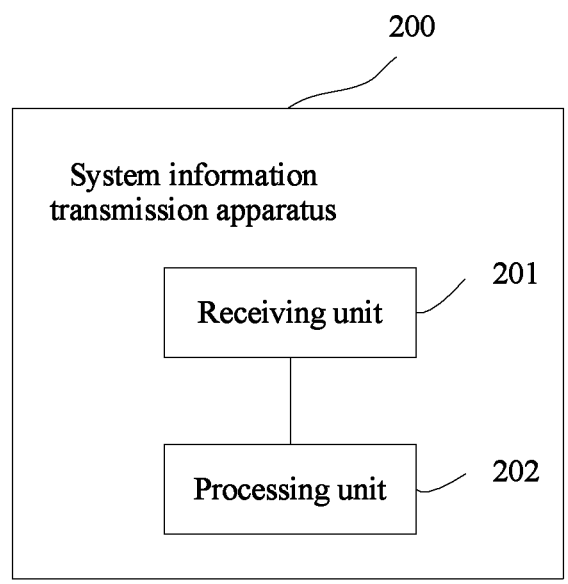
FIG. 9 is a schematic structural diagram of another system information transmission apparatus according to an embodiment.

When an integrated unit is used, FIG. 9 is a schematic diagram of a logical structure of a system information transmission apparatus 200 according to an embodiment. The system information transmission apparatus 200 may be applied to a first terminal device. Referring to FIG. 9, the system information transmission apparatus 200 applied to the first terminal device includes a receiving unit 201 and a processing unit 202. The receiving unit 201 is configured to receive indication information sent by a second terminal device, where the indication information is used to indicate that system information changes. The processing unit 202 obtains the system information according to the indication information received by the receiving unit 201.

In a possible implementation, the processing unit 202 is configured to: when the receiving unit 201 receives the indication information, obtain the system information within a gap period of communication between the second terminal device and the first terminal device through a link between the first terminal device and a base station, where communication between the second terminal device and the first terminal device is suspended within the gap period.

If the first terminal device is in an RRC idle mode, the gap period is configured by the first terminal device or the second terminal device, or if the first terminal device is in an RRC connected mode, the gap period is configured by the second terminal device or the base station for the first terminal device.

In another possible implementation, the receiving unit 201 is further configured to: before the processing unit 202 obtains the system information within the gap period through the link between the first terminal device and the base station, obtain a cell identifier of a cell in which the second terminal device is located.

In still another possible implementation, the indication information is further used to indicate a type of the changed system information.

In still another possible implementation, the processing unit 202 is configured to: when the receiving unit 201 receives the indication information, obtain the system information through a link between the first terminal device and the second terminal device.

When a form of hardware is used, the receiving unit 201 may be a communications interface, a receiver, a transceiver circuit, or the like. The communications interface is a generic term, and may include one or more interfaces. The processing unit 202 may be a processor or a controller.

Figure 10:
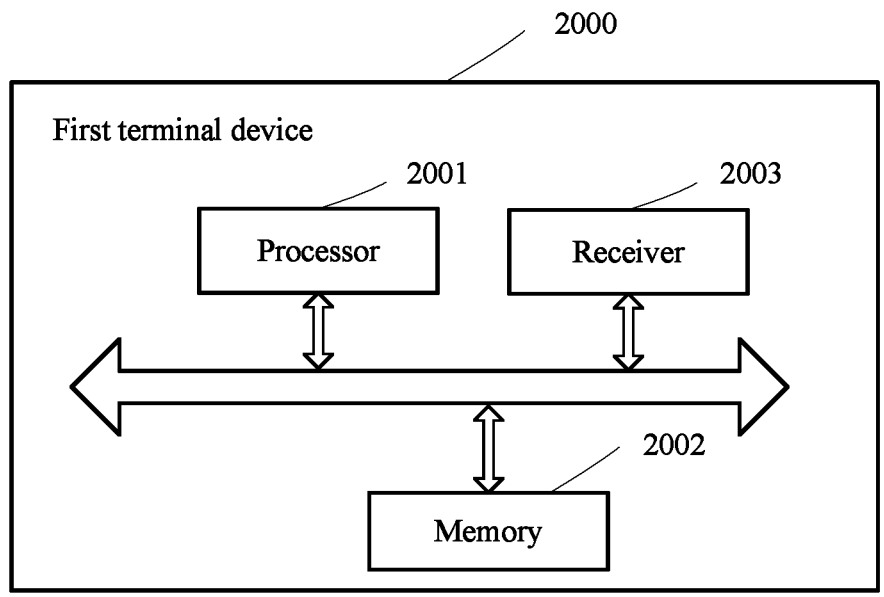
FIG. 10 is a schematic structural diagram of another first terminal according to an embodiment.

When the processing unit 202 is the processor and the receiving unit 201 is the receiver, the system information transmission apparatus 200 in this embodiment may be a first terminal device shown in FIG. 10. The first terminal device shown in FIG. 10 may be a wearable device.

FIG. 10 is a schematic diagram of a first terminal device 2000 according to an embodiment. The first terminal device 2000 may be configured to perform the method performed by the first terminal device in FIG. 6. As shown in FIG. 10, the first terminal device 2000 includes a processor 2001, a memory 2002, and a receiver 2003. The processor 2001, the memory 2002, and the receiver 2003 may be connected to each other through a bus system. The memory 2002 is configured to store a program, an instruction, or code. The processor 2001 is configured to execute the program in the memory 2002 to perform the following operations: controlling the receiver 2003 to receive indication information sent by a second terminal device, performing a step of obtaining system information according to the indication information, and implementing the steps and the functions implemented by the first terminal device in the foregoing implementations. Details are not described herein again.

For exemplary implementations of the processor 2001 and the receiver 2003, refer to exemplary descriptions of the processing unit 202 and the receiving unit 201 in the foregoing implementations in FIG. 9. Details are not described herein again.

Based on the same concept as the foregoing method embodiment, an embodiment further provides a system information transmission apparatus.

Figure 11:
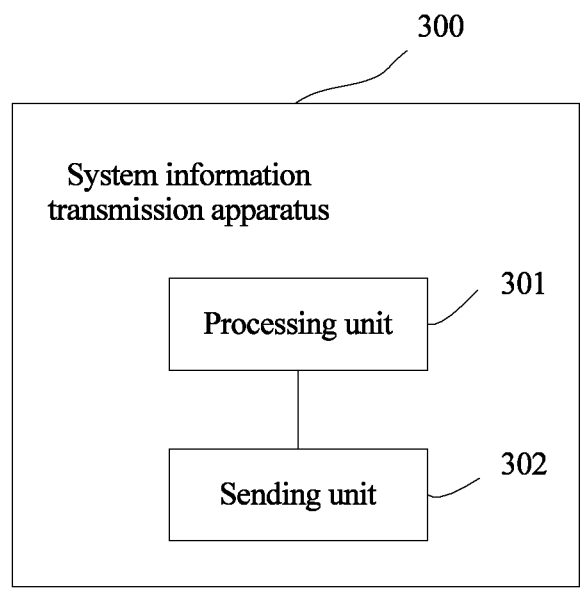
FIG. 11 is a schematic structural diagram of still another system information transmission apparatus according to an embodiment.

When an integrated unit is used, FIG. 11 is a schematic diagram of a logical structure of a system information transmission apparatus 300 according to an embodiment. The system information transmission apparatus 300 may be applied to a second terminal device. Referring to FIG. 11, the system information transmission apparatus 300 applied to the second terminal device includes a processing unit 301 and a sending unit 302. The processing unit 301 is configured to determine on duration of a first terminal device. The sending unit 302 is configured to send system information to the first terminal device during the on duration of the first terminal device determined by the processing unit 301.

The system information is system information required by the first terminal device, and the system information required by the first terminal device is a part or all of system information delivered by a base station of a camped-on cell or a serving cell of the second terminal device.

The system information required by the first terminal device includes changed system information in the system information required by the first terminal device or all system information required by the first terminal device.

In a possible implementation, the sending unit 302 sends the system information at least one time on a paging occasion of the first terminal device by using a resource in a sending resource pool, where the sending resource pool is configured or preconfigured by the base station by using a broadcast message.

The resource in the sending resource pool is a resource that is used by the second terminal device to send a paging message, or the resource in the sending resource pool is a resource that is used by the second terminal device to send the system information to the first terminal device.

In another possible implementation, the sending unit 302 sends the system information at least one time on a paging occasion of the first terminal device by using a dedicated resource, where the dedicated resource is configured by the base station for the second terminal device.

The dedicated resource is determined by the base station based on a dedicated resource requested by the second terminal device from the base station and an indicated time domain resource location of the paging occasion.

In still another possible implementation, the on duration of the first terminal device is a time in which the second terminal device sends a discovery message, and the system information is carried in the discovery message sent by the second terminal device.

In still another possible implementation, the on duration of the first terminal device is a time in which the first device is in an RRC connected mode and may receive a message sent by the second terminal device, and the system information is carried in an RRC message that is sent by the base station and that is forwarded by the second terminal device.

In still another possible implementation, the sending unit 302 is further configured to send indication information to the first terminal device before sending the system information to the first terminal device, where the indication information is used to indicate that the system information changes.

When a form of hardware is used, the processing unit 301 may be a processor or a controller, and the sending unit 302 may be a communications interface, a transmitter, a transceiver circuit, or the like. The communications interface is a generic term, and may include one or more interfaces.

Figure 12:
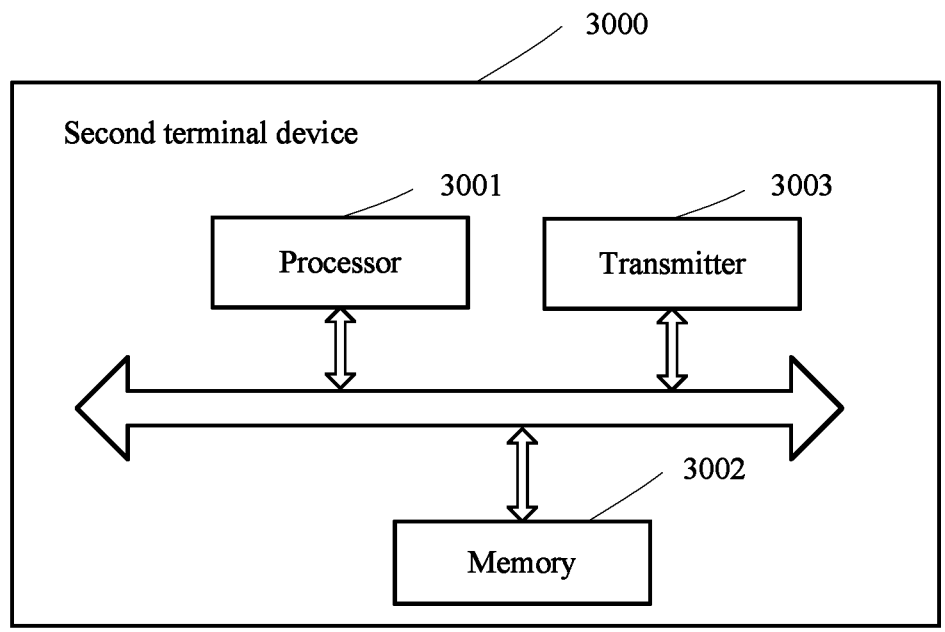
FIG. 12 is a schematic structural diagram of a second terminal according to an embodiment.

When the processing unit 301 is the processor and the sending unit 302 is the transmitter, the system information transmission apparatus 300 in this embodiment may be a second terminal device, as shown in FIG. 12. The second terminal device shown in FIG. 12 may be an intelligent mobile terminal.

FIG. 12 is a schematic diagram of a second terminal device 3000 according to an embodiment. The second terminal device 3000 may be configured to perform the method performed by the second terminal device in FIG. 2, FIG. 3, FIG. 4, and FIG. 5. As shown in FIG. 12, the second terminal device 3000 includes a processor 3001, a memory 3002, and a transmitter 3003. The processor 3001, the memory 3002, and the transmitter 3003 may be connected to each other through a bus system. The memory 3002 is configured to store a program, an instruction, or code. The processor 3001 is configured to execute the program in the memory 3002 to perform the following operations: determining on duration of a first terminal device, controlling the transmitter 3003 to send system information to the first terminal device during the on duration of the first terminal device, and implementing the steps and the functions implemented by the second terminal device in the foregoing implementations. Details are not described herein again.

For exemplary implementations of the processor 3001 and the transmitter 3003, refer to exemplary descriptions of the processing unit 301 and the sending unit 302 in the foregoing implementations in FIG. 11. Details are not described herein again.

Based on the same concept as the foregoing method embodiment, an embodiment further provides a system information transmission apparatus.

Figure 13:
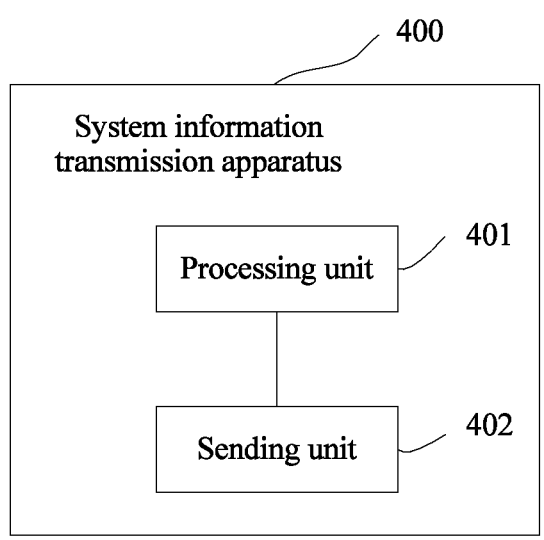
FIG. 13 is a schematic structural diagram of still another system information transmission apparatus according to an embodiment.

When an integrated unit is used, FIG. 13 is a schematic diagram of a logical structure of a system information transmission apparatus 400 according to an embodiment. The system information transmission apparatus 400 may be applied to a second terminal device. Referring to FIG. 13, the system information transmission apparatus 400 applied to the second terminal device includes a processing unit 401 and a sending unit 402. The processing unit 401 is configured to determine that system information required by a first terminal device changes. The sending unit 402 is configured to send indication information to the first terminal device when the processing unit 401 determines that the system information required by the first terminal device changes, where the indication information is used to indicate that the system information changes.

The indication information may be a paging message that is sent by the second terminal device to the first terminal device and that is used to indicate that the system information changes.

In a possible implementation, the processing unit 401 is further configured to: if the first terminal device is in an RRC connected mode, configure a gap period of communication between the second terminal device and the first terminal device for the first terminal device, where communication between the second terminal device and the first terminal device is suspended within the gap period, and the first terminal device obtains the system information through a link between the first terminal device and a base station.

The processing unit 401 is further configured to:

if the first terminal device is in an RRC idle mode, configure a gap period of communication between the second terminal device and the first terminal device for the first terminal device; or if the first terminal device is in an RRC connected mode, configure a gap period of communication between the second terminal device and the first terminal device for the first terminal device.

The sending unit 402 is further configured to: if the first terminal device is in an RRC connected mode, forward a gap period of communication between the second terminal device and the first terminal device that is configured by a network device for the first terminal device, where communication between the second terminal device and the first terminal device is suspended within the gap period, and the first terminal device obtains the system information through a link between the first terminal device and the network device.

In still another possible implementation, the indication information is further used to indicate a type of the changed system information.

In still another possible implementation, the sending unit 402 is further configured to send the system information to the first terminal device through a link between the first terminal device and the second terminal device.

When a form of hardware is used, the processing unit 401 may be a processor or a controller, and the sending unit 402 may be a communications interface, a transmitter, a transceiver circuit, or the like. The communications interface is a generic term, and may include one or more interfaces.

Figure 14:
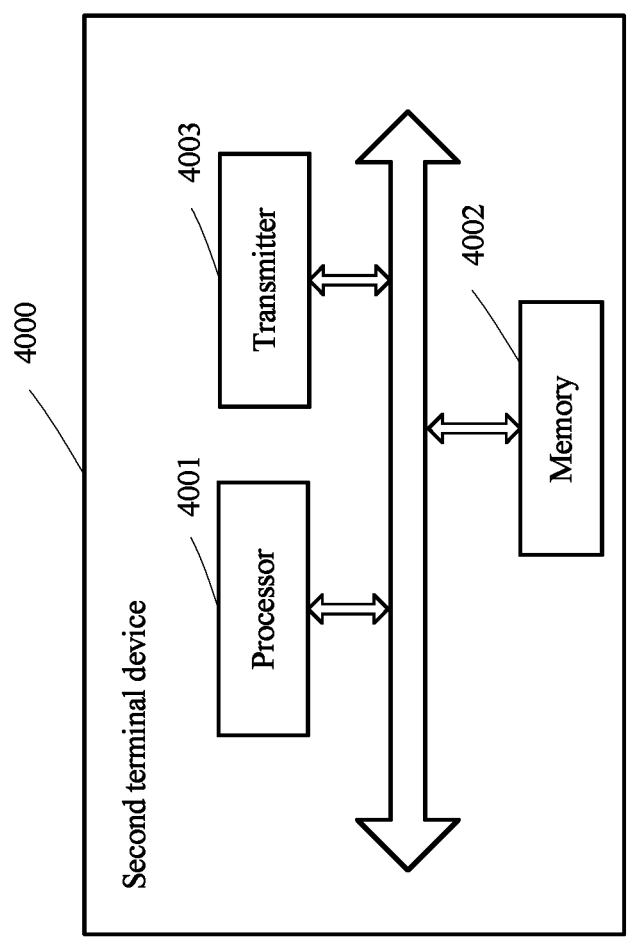
FIG. 14 is a schematic structural diagram of another second terminal according to an embodiment.

When the processing unit 401 is the processor and the sending unit 402 is the transmitter, the system information transmission apparatus 400 in this embodiment may be a second terminal device, as shown in FIG. 14. The second terminal device shown in FIG. 14 may be an intelligent mobile terminal.

FIG. 14 is a schematic diagram of a second terminal device 4000 according to an embodiment. The second terminal device 4000 may be configured to perform the method performed by the second terminal device in FIG. 6. As shown in FIG. 14, the second terminal device 4000 includes a processor 4001, a memory 4002, and a transmitter 4003. The processor 4001, the memory 4002, and the transmitter 4003 may be connected to each other through a bus system. The memory 4002 is configured to store a program, an instruction, or code. The processor 4001 is configured to execute the program in the memory 4002 to perform the following operations: when determining that system information required by a first terminal device changes, controlling the transmitter 4003 to send indication information to the first terminal device, where the indication information is used to indicate that the system information changes; and implementing the steps and the functions implemented by the second terminal device in the foregoing implementations. Details are not described herein again.

For exemplary implementations of the processor 4001 and the transmitter 4003, refer to exemplary descriptions of the processing unit 401 and the sending unit 402 in the foregoing implementations in FIG. 13. Details are not described herein again.

It may be understood that the embodiments show merely simplified exemplary embodiments of the first terminal device and the second terminal device. In actual application, the first terminal device and the second terminal device are not limited to the foregoing structures. For example, the first terminal device may further include a transmitter, and the second terminal device may further include a receiver. In actual application, the first terminal device and the second terminal device each may include any quantity of receivers, transmitters, processors, memories, and the like, and all terminals that can implement the embodiments shall fall within the protection scope of the embodiments.

It may be further understood that the first terminal device and the second terminal device in the embodiments may be configured to implement the corresponding functions of the first terminal device and the second terminal device in the method embodiments. Therefore, for a part that is not described in detail in the embodiments, related descriptions in the method embodiments may be referred to. Details are not described in the embodiments again.

It may be further understood that in the embodiment, the processor may be a central processing unit (CPU), or may be another general purpose processor, a digital signal processor (DSP), an application-specific integrated circuit (ASIC), a field programmable gate array (FPGA), another programmable logic device, a discrete gate, a transistor logic device, a discrete hardware component, or the like. The general purpose processor may be a microprocessor, or the processor may be any conventional processor or the like.

The memory may include a read-only memory and a random access memory, and provide an instruction and data for the processor. A part of the memory may further include a non-volatile random access memory. For example, the memory may further store device type information.

The bus system may include a power bus, a control bus, a status signal bus, and the like in addition to a data bus. However, for clear description, various types of buses in the figure are marked as the bus system.

In an implementation process, the steps in the foregoing method embodiments may be completed by using a hardware integrated logic circuit in the processor or by using an instruction in the form of software. The steps of the system information transmission method disclosed with reference to the embodiments may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method embodiments in combination with hardware in the processor. To avoid repetition, details are not described herein again.

An embodiment provides a communications system, and the communications system includes the foregoing first terminal device and the foregoing second terminal device.

An embodiment provides a computer readable storage medium or a computer program product, configured to store a computer program. The computer program is used to perform the method in any possible implementation of the foregoing method embodiments.

According to the system information transmission method and apparatus provided in the embodiments, when cell system information changes, the first terminal device receives, during the on duration of the first terminal device, the system information sent by the second terminal device, so that the first terminal device can receive the system information through a sidelink between the first terminal device and the second terminal device without a need to maintain a cellular link, thereby reducing complexity and power consumption of system information transmission. Alternatively, when cell system information changes and the first terminal device has only one RX chain, the first terminal device may obtain the system information within the gap period of communication between the second terminal device and the first terminal device through the link between the first terminal device and the base station. Communication between the second terminal device and the first terminal device is suspended within the gap period, so that the changed system information can be received through a cellular link. In addition, the first terminal device may maintain the cellular link only within the gap period and does not need to maintain the cellular link within a period other than the gap period, thereby reducing complexity and power consumption of system information transmission to some extent.

A person of ordinary skill in the art should understand that the embodiments may be provided as a method, a system, or a computer program product. Therefore, the embodiments may use a form of hardware-only embodiments, software only embodiments, or embodiments with a combination of software and hardware. Moreover, the embodiments may use a form of a computer program product that is implemented on one or more computer-usable storage media (including but not limited to a magnetic disk memory, a CD-ROM, an optical memory, and the like) that include computer-usable program code.

The embodiments are described with reference to the flowcharts and/or the block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, so that a series of operations and steps are performed on the computer or programmable device, thereby generating computer-implemented processing. Therefore, the instructions executed on the computer or programmable device provide steps for implementing a function in one or more processes in the flowcharts and/or in one or more blocks in the block diagrams.

What is claimed is:

1. A system information transmission method, comprising:
   determining, by a first terminal device, an on duration of the first terminal device; and
   receiving, by the first terminal device during the on duration of the first terminal device, system information sent by a second terminal device, wherein the on duration of the first terminal device is a paging occasion of the first terminal device
   wherein the receiving, by the first terminal device during the on duration of the first terminal device of the system information sent by the second terminal device further comprises:
   receiving, by the first terminal device on the paging occasion of the first terminal device, the system information sent by the second terminal device at least one time by using a resource in a sending resource pool, wherein the sending resource pool is configured or preconfigured by a network device by using a broadcast message; or
   receiving, by the first terminal device on the paging occasion of the first terminal device, the system information sent by the second terminal device at least one time by using a dedicated resource, wherein the dedicated resource is configured by a network device for the second terminal device,
   wherein the system information is system information required by the first terminal device, and the system information required by the first terminal device is a part or all of system information delivered by a network device of a camped-on cell or a serving cell of the second terminal device; and
   the system information required by the first terminal device comprises:

only changed system information required by the first terminal device.

2. The method according to claim 1, wherein the on duration of the first terminal device is a time in which the first terminal receives a discovery message sent by the second terminal device, and the system information is carried in the discovery message sent by the second terminal device; or the on duration of the first terminal device is a time in which the first terminal device is in a radio resource control (RRC) connected mode and may receive a message sent by the second terminal device, and the system information is carried in an RRC message that is sent by a network device and that is forwarded by the second terminal device.

3. The method according to claim 1, wherein before the receiving, by the first terminal device, of the system information sent by a second terminal device, the method further comprises:

receiving, by the first terminal device, indication information sent by the second terminal device, wherein the indication information is used to indicate that the system information changes.

4. A system information transmission method, comprising:

receiving, by a first terminal device, indication information sent as a paging message by a second terminal device, wherein the indication information is used to indicate that system information changes; and obtaining, by the first terminal device, the system information through a link between the first terminal device and a network device within a gap period of communication between the second terminal device and the first terminal device, wherein communication between the second terminal device and the first terminal device is suspended within the gap period, wherein the system information obtained by the first terminal device comprises:

only changed system information required by the first terminal device.

5. The method according to claim 4, wherein if the first terminal device is in an RRC idle mode, the gap period is configured by the first terminal device or the second terminal device; or if the first terminal device is in an RRC connected mode, the gap period is configured by the second terminal device or the network device for the first terminal device.

6. A system information transmission method, comprising:

determining, by a second terminal device, an on duration of a first terminal device; and sending, by the second terminal device, system information to the first terminal device during the on duration of the first terminal device, wherein the on duration of the first terminal device is a paging occasion of the first terminal device, wherein the sending, by the second terminal device, of the system information to the first terminal device during the on duration of the first terminal device comprises:

sending, by the second terminal device, the system information at least one time on the paging occasion of the first terminal device by using a resource in a sending resource pool, wherein the sending resource pool is configured or preconfigured by a network device by using a broadcast message; or sending, by the second terminal device, the system information at least one time on the paging occasion of the first terminal device by using a dedicated resource, wherein the dedicated resource is configured by a network device for the second terminal device, wherein the system information is system information required by the first terminal device, and the system information required by the first terminal device is a part or all of system information delivered by a network device of a camped-on cell or a serving cell of the second terminal device; and the system information required by the first terminal device comprises:

only changed system information required by the first terminal device.

7. The method according to claim 6, wherein the on duration of the first terminal device is a time in which the second terminal device sends a discovery message, and the system information is carried in the discovery message sent by the second terminal device; or the on duration of the first terminal device is a time in which the first terminal device is in an RRC connected mode and may receive a message sent by the second terminal device, and the system information is carried in an RRC message that is sent by a network device and that is forwarded by the second terminal device.

8. The method according to claim 6, wherein before the sending, by the second terminal device, of the system information to the first terminal device, the method further comprises:

sending, by the second terminal device, indication information to the first terminal device, wherein the indication information is used to indicate that the system information changes.

* * * * *